United States Patent
McCord et al.

(10) Patent No.: US 11,501,232 B2
(45) Date of Patent: Nov. 15, 2022

(54) SYSTEM AND METHOD FOR INTELLIGENT SALES ENGAGEMENT

(71) Applicant: NewVoiceMedia, Ltd., Basingstoke (GB)

(72) Inventors: Alan McCord, Wakatipu Queenstown (NZ); Ashley Unitt, Basingstoke (GB); Mark Fellowes, Hawley (GB); Andrew Carson, Woodley (GB); Selma Ardelean, London (GB)

(73) Assignee: VONAGE BUSINESS LIMITED, Basingstoke (GB)

( * ) Notice: Subject to any disclaimer, the term of this patent is extended or adjusted under 35 U.S.C. 154(b) by 292 days.

(21) Appl. No.: 16/735,595

(22) Filed: Jan. 6, 2020

(65) Prior Publication Data

US 2020/0286013 A1 Sep. 10, 2020

Related U.S. Application Data

(63) Continuation of application No. 15/193,055, filed on Jun. 25, 2016, now abandoned.

(60) Provisional application No. 62/304,926, filed on Mar. 7, 2016.

(51) Int. Cl.
  *G06N 20/00* (2019.01)
  *G06Q 10/06* (2012.01)
  *G06N 7/00* (2006.01)

(52) U.S. Cl.
  CPC ......... *G06Q 10/0633* (2013.01); *G06N 7/005* (2013.01); *G06N 20/00* (2019.01)

(58) Field of Classification Search
  CPC .. G06N 3/02; G06N 3/08; G06N 3/10; G06N 5/022; G06N 99/005
  See application file for complete search history.

(56) References Cited

U.S. PATENT DOCUMENTS

| | | | |
|---|---|---|---|
| 8,200,524 B2 | 6/2012 | Narvaez et al. | |
| RE45,959 E * | 3/2016 | McCord | H04L 67/322 |
| 9,654,633 B2 * | 5/2017 | McCord | H04M 3/5232 |
| 2004/0083195 A1 * | 4/2004 | McCord | H04M 3/5233 |
| | | | 707/999.107 |
| 2010/0165977 A1 * | 7/2010 | McCord | H04L 12/66 |
| | | | 370/352 |
| 2011/0188648 A1 * | 8/2011 | Pickering | H04M 3/5183 |
| | | | 379/211.02 |
| 2011/0196716 A1 | 8/2011 | Srinivasan et al. | |
| 2014/0173078 A1 * | 6/2014 | McCord | H04L 41/0823 |
| | | | 709/223 |
| 2016/0239762 A1 * | 8/2016 | McCord | H04M 3/5175 |

(Continued)

OTHER PUBLICATIONS

Peter Zvirinsky, "Social network and Data Mining", 2014, pp. 1-152 (Year: 2014).*

*Primary Examiner* — Paulinho E Smith
(74) *Attorney, Agent, or Firm* — Galvin Patent Law LLC; Joseph Pagnotta; Brian S. Boon

(57) ABSTRACT

A system for automatically automatic workflow triggering using real-time analytics, comprising an analytics server that receives and analyzes interaction information and a workflow server that produces workflow events based on the analysis, sends workflow events to handlers for processing, retrieves workflow-related data, and produces workflow reports for review, and a method for automatically automatic workflow triggering using real-time analytics.

2 Claims, 13 Drawing Sheets

(56) References Cited

U.S. PATENT DOCUMENTS

2016/0350663 A1* 12/2016 McCord .................. G06F 16/36
2017/0132421 A1*  5/2017 Unitt ................. H04M 3/42221
2017/0169325 A1*  6/2017 McCord ................. G06N 7/005

* cited by examiner

SYSTEM AND METHOD FOR INTELLIGENT SALES ENGAGEMENT

CROSS-REFERENCE TO RELATED APPLICATIONS

| application Ser. No. | Date Filed | Title |
|---|---|---|
| Current application | Herewith | SYSTEM AND METHOD FOR INTELLIGENT SALES ENGAGEMENT Is a continuation of: |
| 15/193,055 | Jun. 25, 2016 | SYSTEM AND METHOD FOR INTELLIGENT SALES ENGAGEMENT which claims benefit of, and priority to: |
| 62/304,926 | Mar. 7, 2016 | SYSTEM AND METHOD FOR INTELLIGENT SALES ENGAGEMENT | the entire specification of each of which is incorporated herein by reference.

BACKGROUND OF THE INVENTION

Discussion of the State of the Art

Business-to-Business (B2B) selling has a long history spanning over half a century. The 1960's were dominated by in-person sales pitches, the 1990's and the growth of the internet saw the introduction of email selling and, in the late 1990s, Customer Relationship Management (CRM) systems were deployed. The first decade of the $21^{st}$ century has witnessed the rise of social networks and social media being used as a new channel to generate leads.

The Purchase Funnel

The concept of managing a sales process through a set of pre-defined sales funnel or pipeline states dates back to the late 1800's.

Today B2B companies routinely use software and basic analytics to manage the sales pipeline, practicing management-by-exception for prospects that fall outside the bands of expected sales stage durations.

However today, as customers become more empowered with on-line knowledge and sellers become more empowered with vast amounts of data about prospects the process is no longer linear. Prospects can enter a funnel at almost any stage and can remain in a stage for long periods of time or jump backward and forward between stages. In both B2B and B2C businesses, customers are doing their own research both online and with their colleagues and friends. Prospects are essentially navigating themselves through the funnel.

The Customer Decision Journey

In an attempt to account for this nonlinear nature of the sales process, an alternative to the linear funnel is the Customer Decision journey popularized by McKinsey. In this model the journey is circular and prospects move through an ongoing set of touch points before, during, and after a purchase.

The circular Customer Decision Journey is an improvement over the traditional funnel, but it is incomplete for several reasons. The state change from the customer point of view is the experience and not the purchase however. The focus is still on the transaction. So the Customer Decision Journey is essentially only a circular funnel.

The Customer Engagement Journey

In an attempt to shift the focus from the transaction to the relationship the circular model has more recently been replaced by the Customer Engagement journey. In this engagement-focused model, transactions occur in the context of the relationship rather than relationships in the context of the transaction. The focus is more on engagement than decision. This can be taken even a step further by considering a User Experience journey in which opportunities for transactions are strategically inserted.

Need for a New Platform

The Customer Decision Journey, the funnel and other "topologies" described above are widely used today and work satisfactorily in specific cases. However software vendors provide platforms that can handle only certain types of flows and require significant amounts of human design upfront each time they are implemented. As a result they are rigid and cannot adaptive to new behavioral patterns and experiences that are rapidly emerging through new means of engagement and transaction on the internet, via mobile devices and social networks. As customers become more empowered with on-line knowledge and sellers become more empowered with vast amounts of data a new kind of platform is required to manage the complexity of the sales processes in a more automated way that requires less human up-front and configuration and can dynamically evolve in a way that could not be matched by human redesigning.

SUMMARY OF THE INVENTION

The current invention is a platform that embodies recent advances in machine learning and optimization technology to automatically learn, evolve and optimize journeys of arbitrary topology within reduced human input. The platform can be pre-configured with predefined topology flows such as funnels, journeys, or other topologies decided in advance by a human. But the system can also learn a topology flow from data or evolve an existing flow to a better one. It can, if permitted, dynamically evolve over time. It is left to the human to define what a better outcome actually is, and to define the constraints experiences, the evolution and the resources to be consumed.

The three core components of the invention are (i) a flexible mathematical graph software module for accumulating real world events and representing them as transitions that occur between states and manipulating the graphs, (ii) a machine learning module for building predictive models for the transitions between states on the graph, finding anomalies and simplifying the graph, and (iii) an optimization framework for generating decisions and real world actions that increase the value of the overall business objective to be maximized by the platform given a set of business, experiential or financial constraints Of specific importance is that the platform disclosed can self learn and then derive a sales process that strikes an optimal balance between focus on experience, engagement and transaction.

According to a preferred embodiment of the invention, a system for intelligent sales engagement, comprising: a pre-integrated graph module comprising at least a plurality of programming instructions stored in a memory and operating on a processor of a network-connected computing device, a machine learning module comprising at least a plurality of programming instructions stored in a memory and operating on a processor of a network-connected computing device and an optimization module comprising at least a plurality of programming instructions stored in a memory and operating on a processor of a network-connected computing device. The pre-integrated graph module: monitors and captures events from source systems and constructs an event graph of multichannel interactions and attributes including firm demographics and sales rep attributes, automatically reduces the graph to the significant state transitions, effectively reverse engineering the sales process from available actual event data, runs in an adaptive mode where reducing the graph happens periodically or continuously, and supports different pre-defined topologies of funnel, circle and journey. The machine learning module: trains a family of predictive machine-learning models (e.g. Distributed Random Forest, Deep Learning) for any transition of interest (or for all transitions) of the reduced graph and performs validation of the accuracy (AUC) of each predictive machine learning model, chooses different model types for different transitions based on model with highest accuracy, model then estimates the conditional probability of the transition from the starting to ending state potentially including all known input attributes at the starting state, accepts arbitrary numbers of input attributes of different types on each state transitions, runs with either full state history with attributes, Markov approximation or hidden Markov model or a hybrid mode; and supports a hidden Markov model to represent the hidden "intent" state of the contact or lead. The optimization module: creates a set of visualizations showing the various resulting performance metrics including conversion rate, representative utilization percent, and total value in the pipeline, uses the trained predictive models as input to an automated optimization phase which recommends specific actions (interactions) to take to optimize the business outcome of prospects flowing through the reduced graph subject to constraints, supports optimization under uncertainty; schedules interactions between agents and prospects to maximize an objective, and configures, in addition to existing model optimization, optimization experiments that are executed and is then able to run experiments, analyze the results and self-learn giving rise to increased utility.

According to another embodiment of the invention, the expected sales process may be entered as input to guide graph reduction and/or highlight deviations from expected flows. Wherein the graph may also represent B2B flows and B2C flows. The machine learning module may learn or reverse engineer a process based on historical data. The machine learning module may account for the multi-dimensional nature of social influence, and the role of advocates who aren't customers. The machine learning module may shift to ongoing relationships beyond individual transactions. The machine learning module runs in an adaptive mode where retraining happens periodically or continuously The optimization module can use the trained predictive models can be used to support a "what-if" user interface for human users to understand the effect of change of attributes or graph structure.

According to another preferred embodiment of the invention, a method for intelligent sales engagement, the method comprising the steps of: (a) monitoring and extracting sets of customer relationship sales data from source systems into a pre-integrated graph module comprising at least a plurality of programming instructions stored in a memory and operating on a processor of a network-connected computing device. (b) constructing an event driven relational graph of multichannel interactions and attributes including firm demographics and sales representative attributes using the pre-integrated graph module. (c) reducing the graph to the significant state transition occurrences, effectively reverse engineering the sales process from available actual event data expressing the resultant graph in one of a plurality of pre-defined topologies such as: funnel, circle and journey using the pre-integrated graph module. (d) training a family of predictive machine-learning models, such as Distributed Random Forest, Deep Learning for any transition of interest (or for all transitions) of the reduced graph and performs validation of the accuracy (AUC) of each predictive machine learning model using a machine learning module comprising at least a plurality of programming instructions stored in a memory and operating on a processor of a network-connected computing device. (e) choosing different model types using the machine learning module for different transitions based on model with highest accuracy, chosen model then estimates conditional probability of the transition from the starting to ending state potentially including all known input attributes at the starting state. (f) running either full state history with attributes, Markov approximation or hidden Markov model or a hybrid mode using the machine learning module. (g) creating a set of visualizations showing the various resulting performance metrics including conversion rate, rep utilization %, and total value in the pipeline using the optimization module. (h) using the trained predictive models as input to an automated optimization phase which recommends specific actions (interactions) to take to optimize the business outcome of prospects flowing through the reduced graph subject to constraints using the optimization module.

BRIEF DESCRIPTION OF THE DRAWING FIGURES

DETAILED DESCRIPTION

Figure 1:
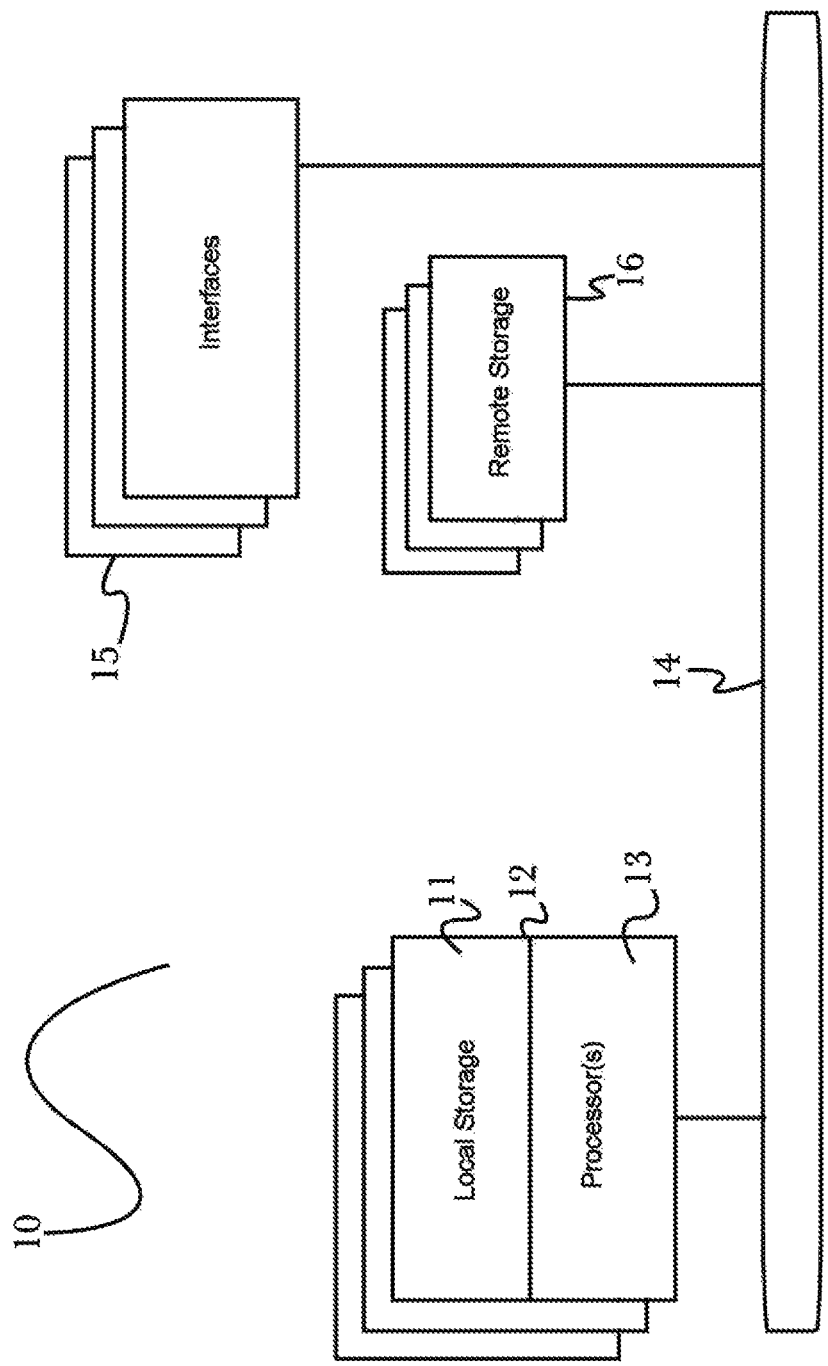
FIG. 1 is a block diagram illustrating an exemplary hardware architecture of a computing device used in an embodiment of the invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
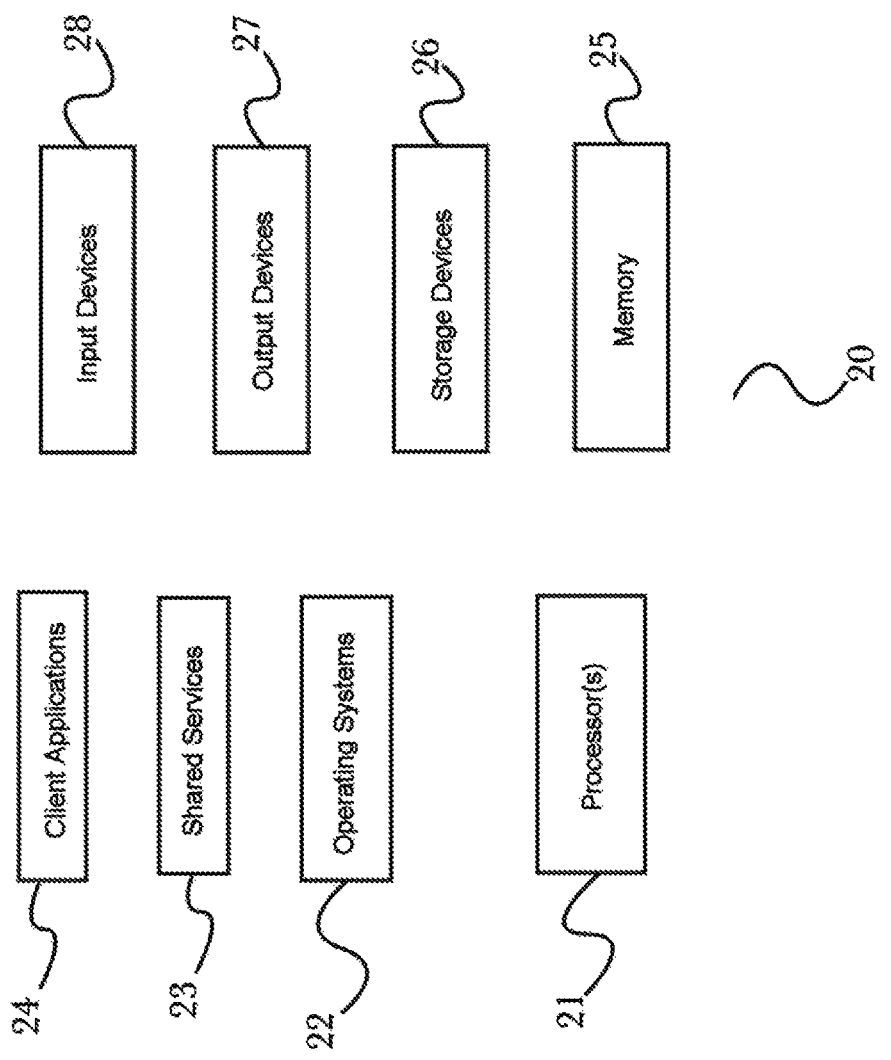
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, userspace common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 3:
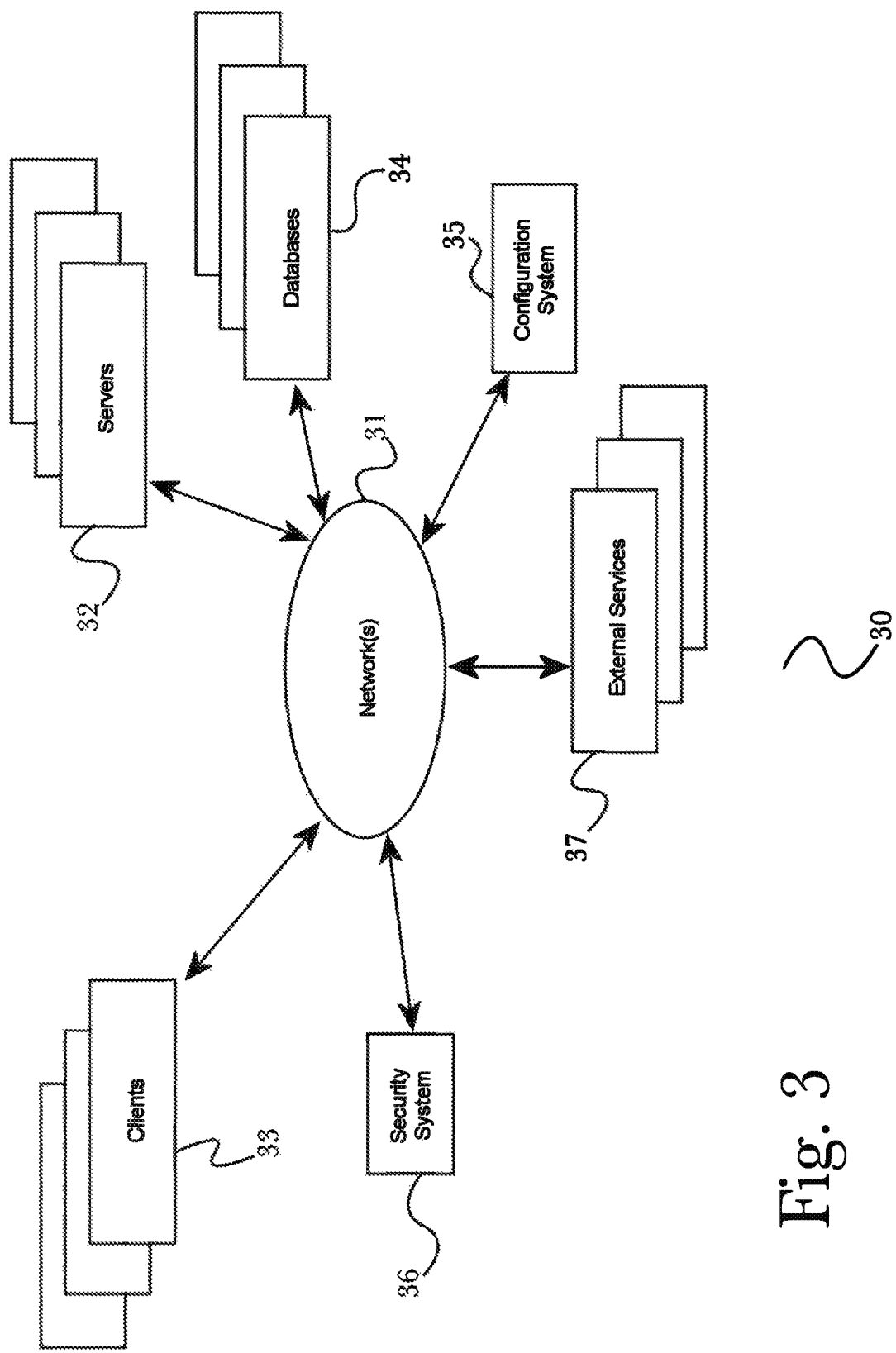
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 4:
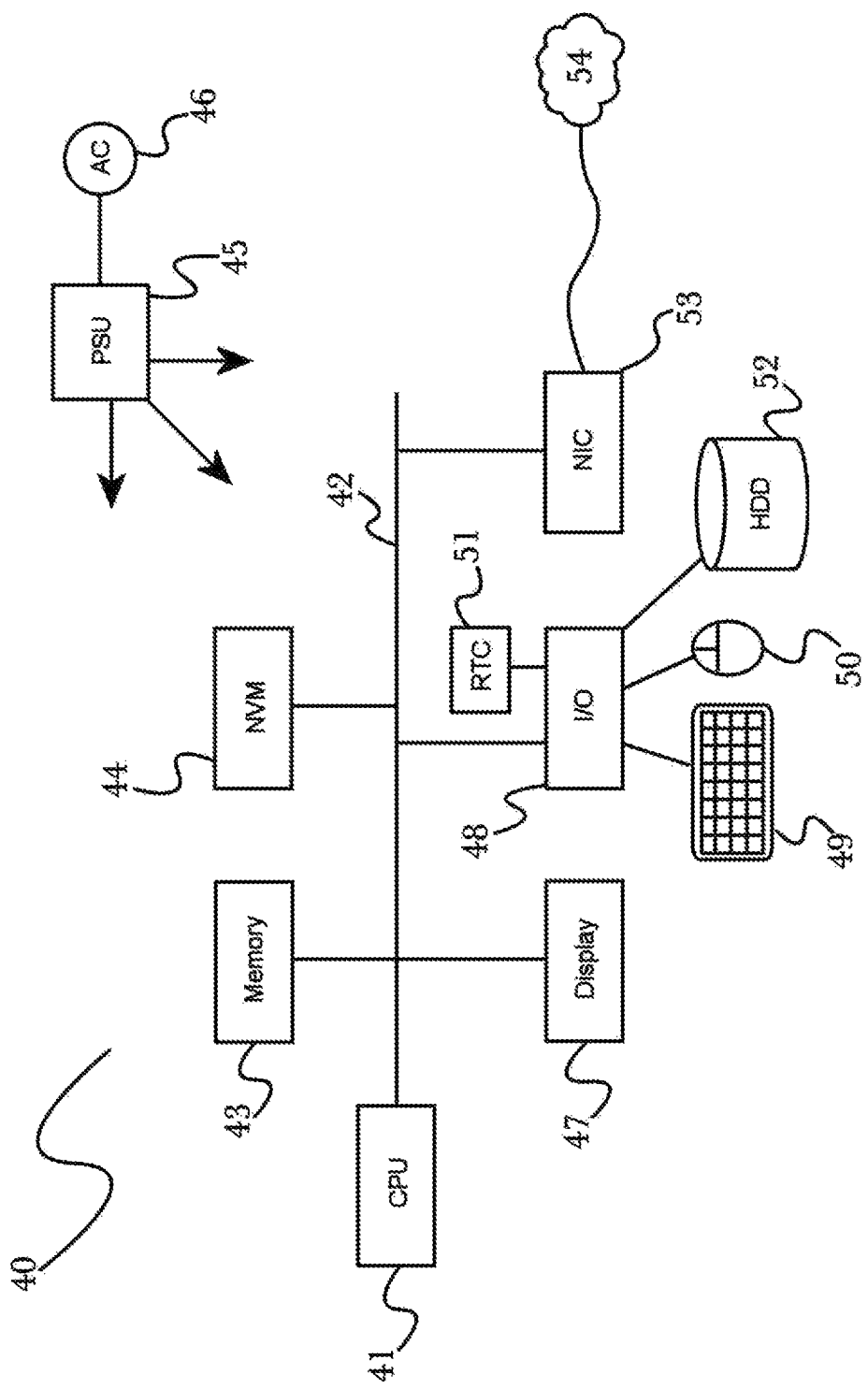
FIG. 4 is another block diagram illustrating an exemplary hardware architecture of a computing device used in various embodiments of the invention.

FIG. 4 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
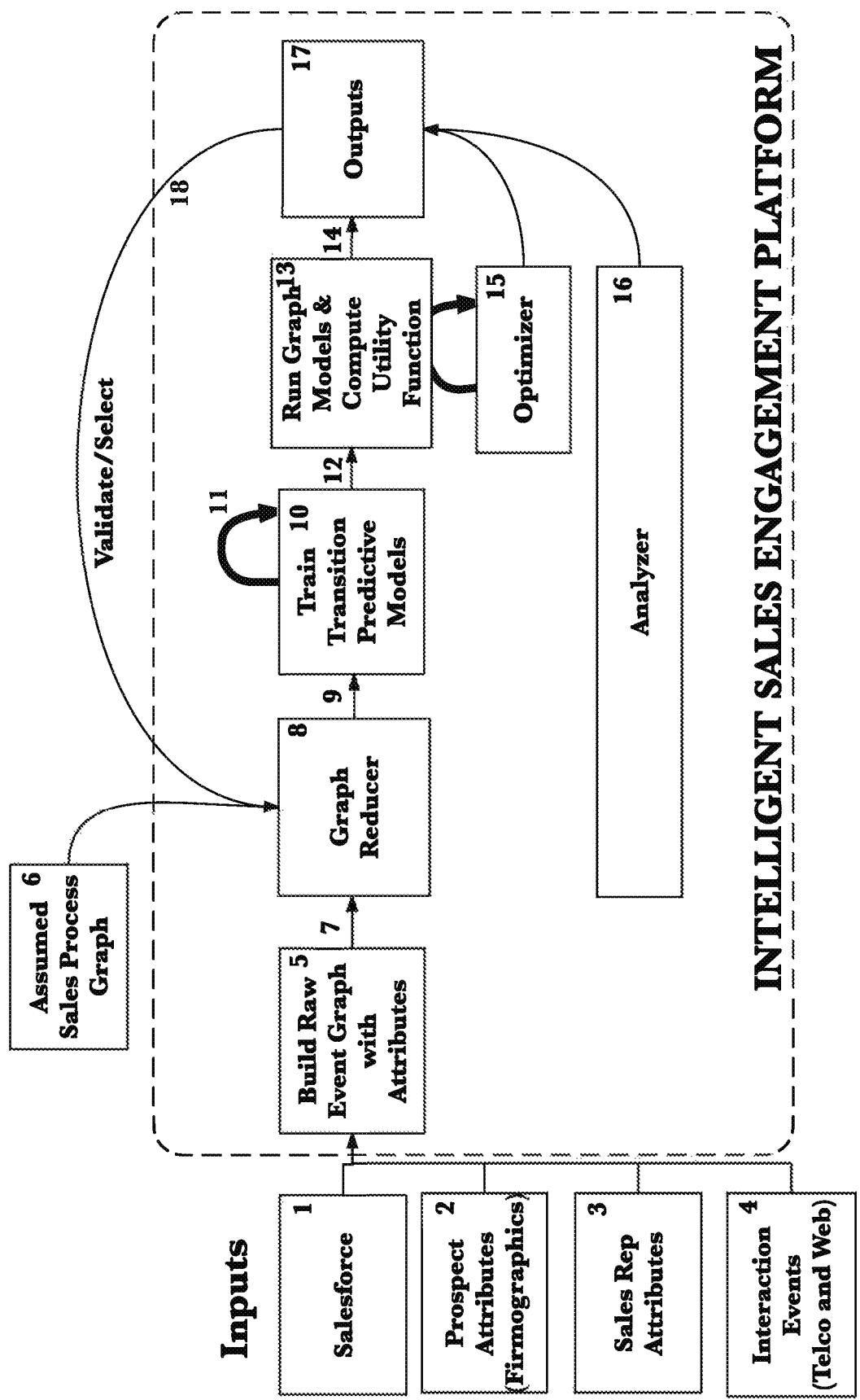
FIG. 5 is a block diagram illustrating an exemplary platform architecture used in an embodiment of the invention.

FIG. 5 is a block diagram illustrating an exemplary platform architecture used in an embodiment of the invention. Data is received by the platform from a variety of real-world sources as time-stamped events. Other data is not event-like, consisting of descriptive attributes. One feed of data [4] comes from voice telephony and multi-channel communications infrastructure such as a contact center. Other data [1] comes from external platforms that serve as a data repository for known information regarding contacts, leads, opportunities and accounts. Other data sources [2] provide information about a prospect such as firmographic data (in the B2B case) or demographic data (in the B2C case).

The module [5] takes each event and adds it as a new edge on a directed graph corresponding to a transition between 2 states represented by the event. The additional available data attributes are attached as attributes to either the new edges or to vertices in the graph. The raw event graph (constructed from these raw events) can be large and but be persisted to permanent disk storage if necessary.

The graph reducer module [8] is responsible for reducing or simplifying the raw event graph to a level that is appropriate for representing significant states and transitions of interest. By significant we mean states or transitions that capture an important experience, interaction or transaction that is part of the optimization objective or constraint. Two modes are supported. One in which the system statistically determines which experiences, interactions or transactions are important using supervised machine learning (details provided later). The other approach is for a human administrator to provide an "Assumed Sales Process Graph" [6], which defines what is currently believed to be the important states and transitions of interest (and therefore the corresponding experiences, interactions, transactions and value contributions).

The machine learning module [10] uses the historical data in the reduced graph to build predictive models of the conditional probability of transition between these states of interest.

Module [15] is the optimizer, which takes as input (i) a list of decision variables the optimizer is allowed to manipulate, (ii) an objective function definition to be optimized by changing the decision variables and (iii) a list of constraints (rules) that must not be violated by the output from the optimizer. Optimization problems of this scale cannot be solved by traditional linear solver engines with so, optionally, a solver based on Approximate Dynamic Programming (ADP) is used.

The outputs [17] include the values of the decision variables chosen by the optimizer, together with various performance metrics calculated by the analyzer [16].

Figure 6:
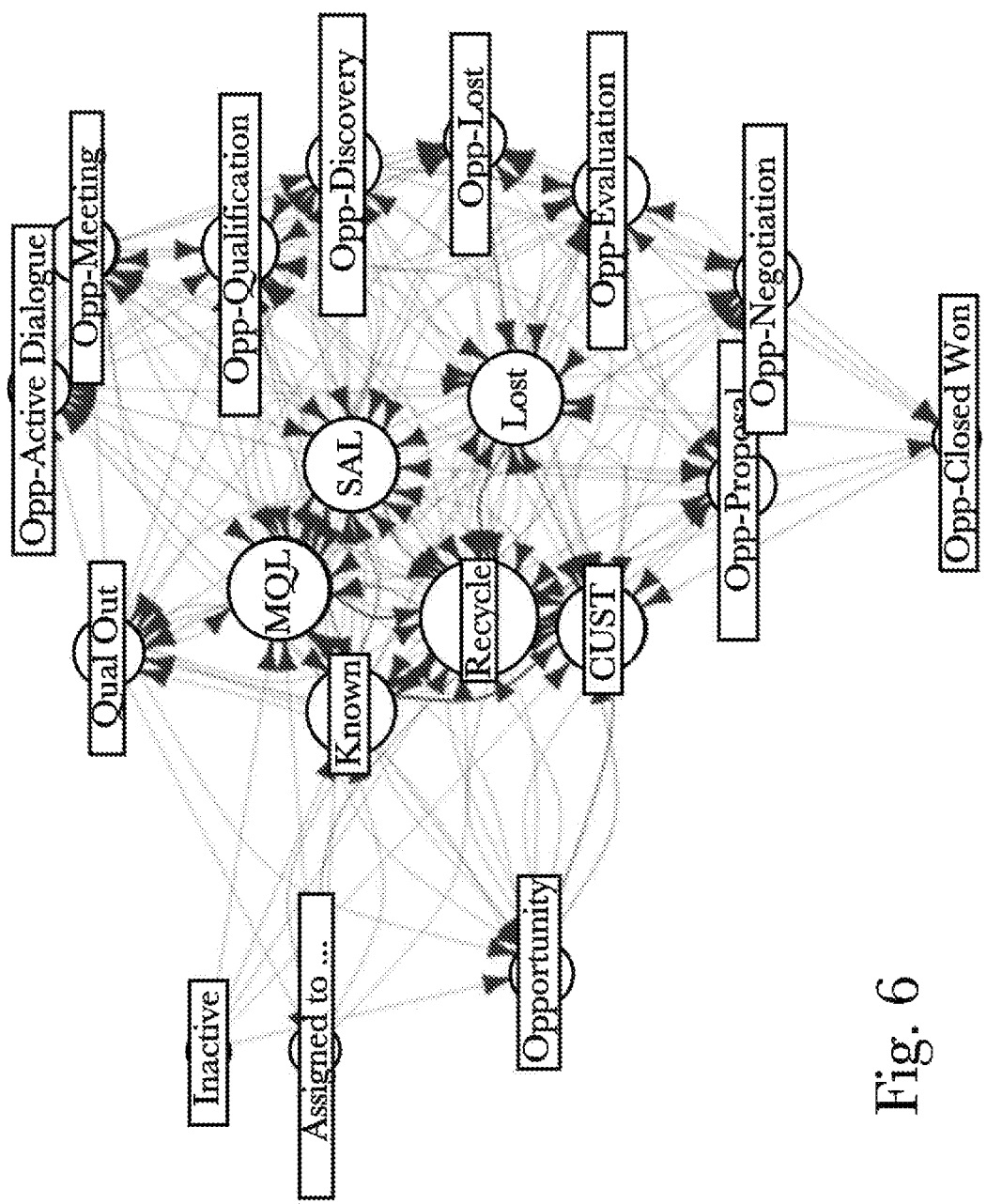
FIG. 6 is a diagram illustrating an exemplary graph of state transitions, according to an embodiment of the invention.

FIG. 6 is a diagram illustrating an exemplary graph of state transitions, according to an embodiment of the invention. The Edge weights are based on transition probability and/or value. The filters are on edge weights, counts, % or % of log(count). The graph shows attributes on edges or vertices. The community is shown on each meta vertex.

Figure 7:
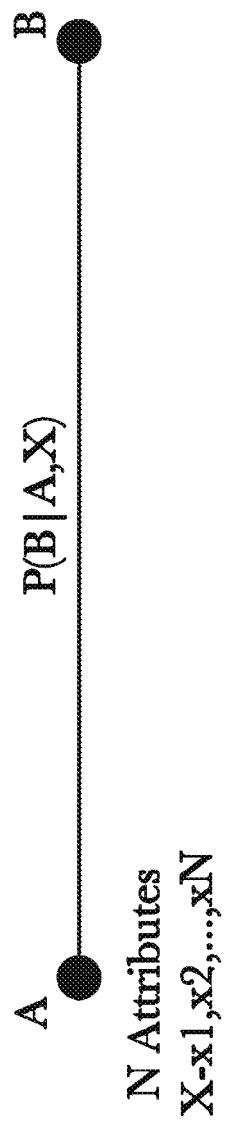
FIG. 7 is diagram showing an exemplary of simple conditional transition probability between two states, A and B, according to an embodiment of the invention.

FIG. 7 is diagram showing an exemplary of simple conditional transition probability between two states, A and B, according to an embodiment of the invention. The simple case of a transition between two states where there is only one possible path is shown in FIG. 7. A supervised machine learning model can be trained using historical examples of this transition that include the N attributes x1, x2, . . . , xN known on input at state A. Cases that arrived at B are labeled success. The machine learning model can then be used to compute the probability of an entity in state A transitioning to state B for various values of x1, . . . , xN.

Figure 8:
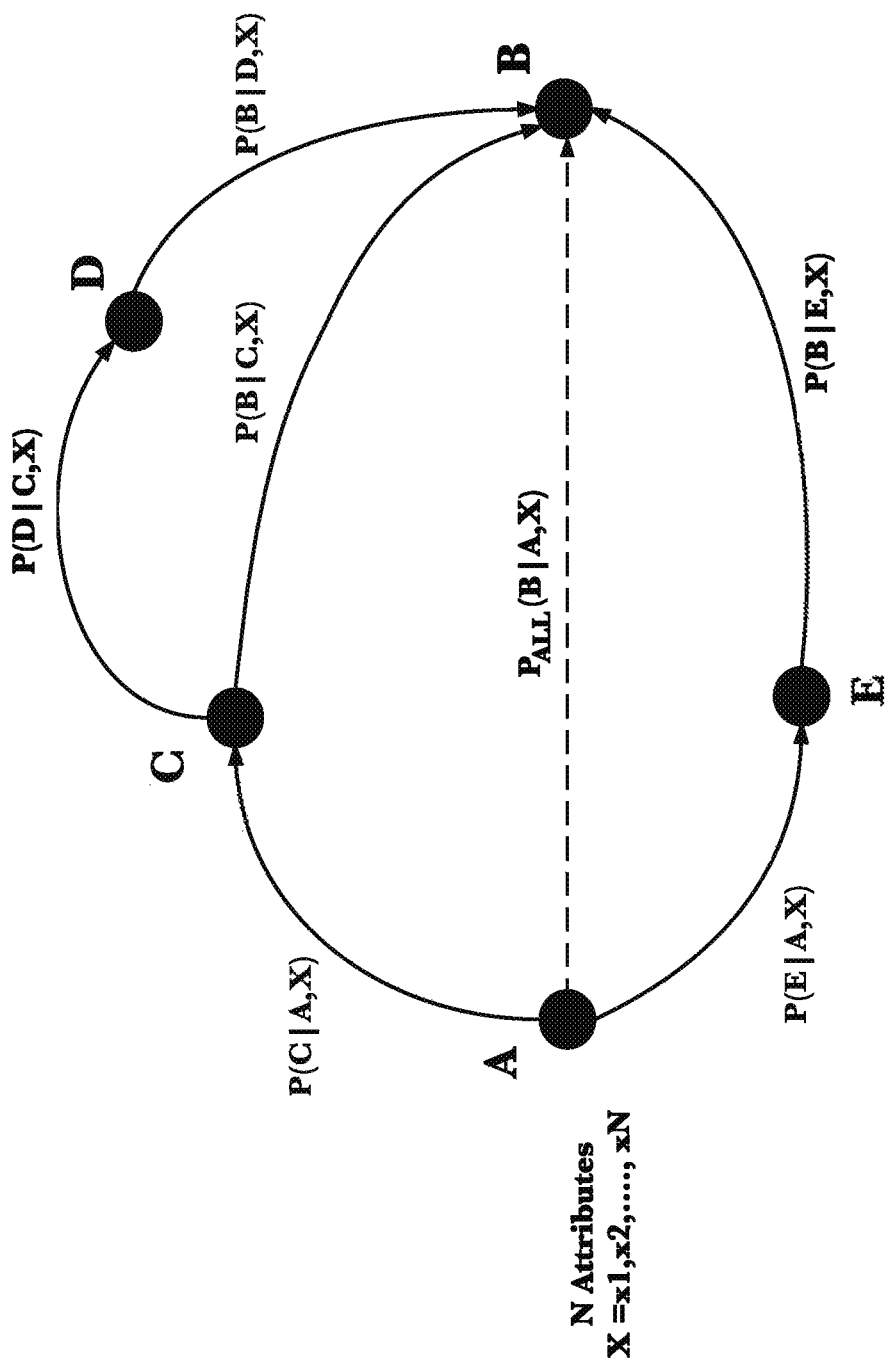
FIG. 8 is flow diagram illustrating virtual transition probability between states A and B according to an embodiment of the invention.

FIG. 8 is flow diagram illustrating virtual transition probability between states A and B according to an embodiment of the invention. A more typical case is shown in FIG. 8 where there are many possible pathways between A and B. Note that the direct transition A to B may not occur in the historical data. Nevertheless, by taking all historical data cases that started at A and labeling those cases as successful that completed in B then we can again train a supervised machine learning model to compute the transition conditional probability $P_{ALL}$ from A to B given the known parameters X at A. But of course $P_{ALL}(B|A,X)$ says nothing about how the cases that did not make it to B are distributed across states (A,C,D and E). In the case where the X are the same on all states then this reduces to a Markov Chain.

Figure 9:
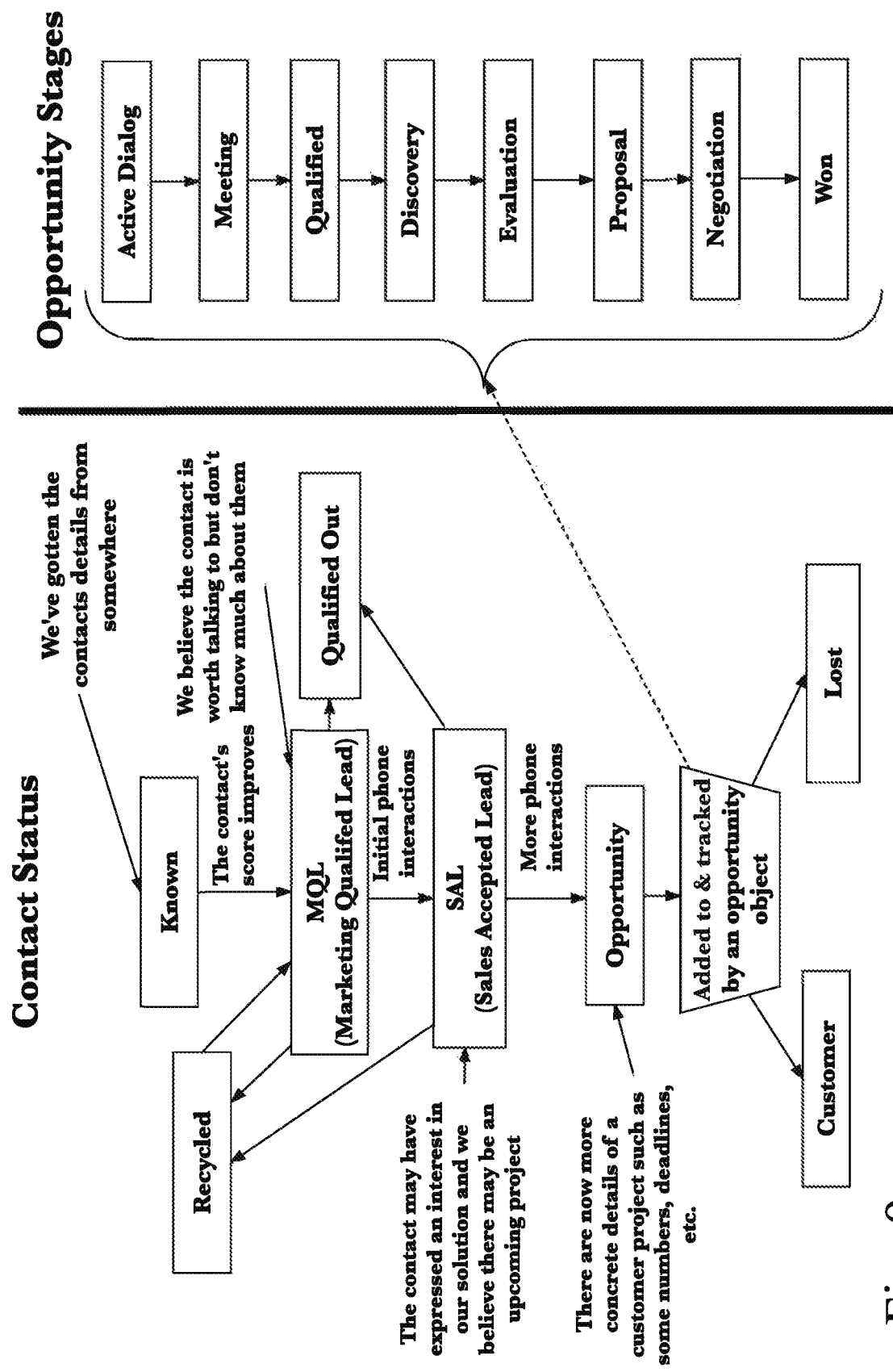
FIG. 9 is a block diagram of an exemplary state model for contact and opportunity, according to a preferred embodiment of the invention.

FIG. 9 is a block diagram of an exemplary state model for contact and opportunity, according to a preferred embodiment of the invention. As an example of one of many possible application of the platform we focus in this section on a B2B use case of customer interactions in the pre-pipeline. By interactions we mean here information exchange events such as a human-to-human phone call, an email, text message, etc. In this "pre-pipeline" case we wish to optimize the interactions that take place between a selling agent and an individual prior to the first human face-to-face meeting in the sales process. The post-human-meeting sales pipeline is well understood and there is considerable prior art in this area.

Good "pre-pipeline" management really requires a deeper linkage between more traditionally separate sales and marketing responsibilities. In essence the platform represents the application of the next generation of sales operations techniques in the of domain sales development.

Figure 10:
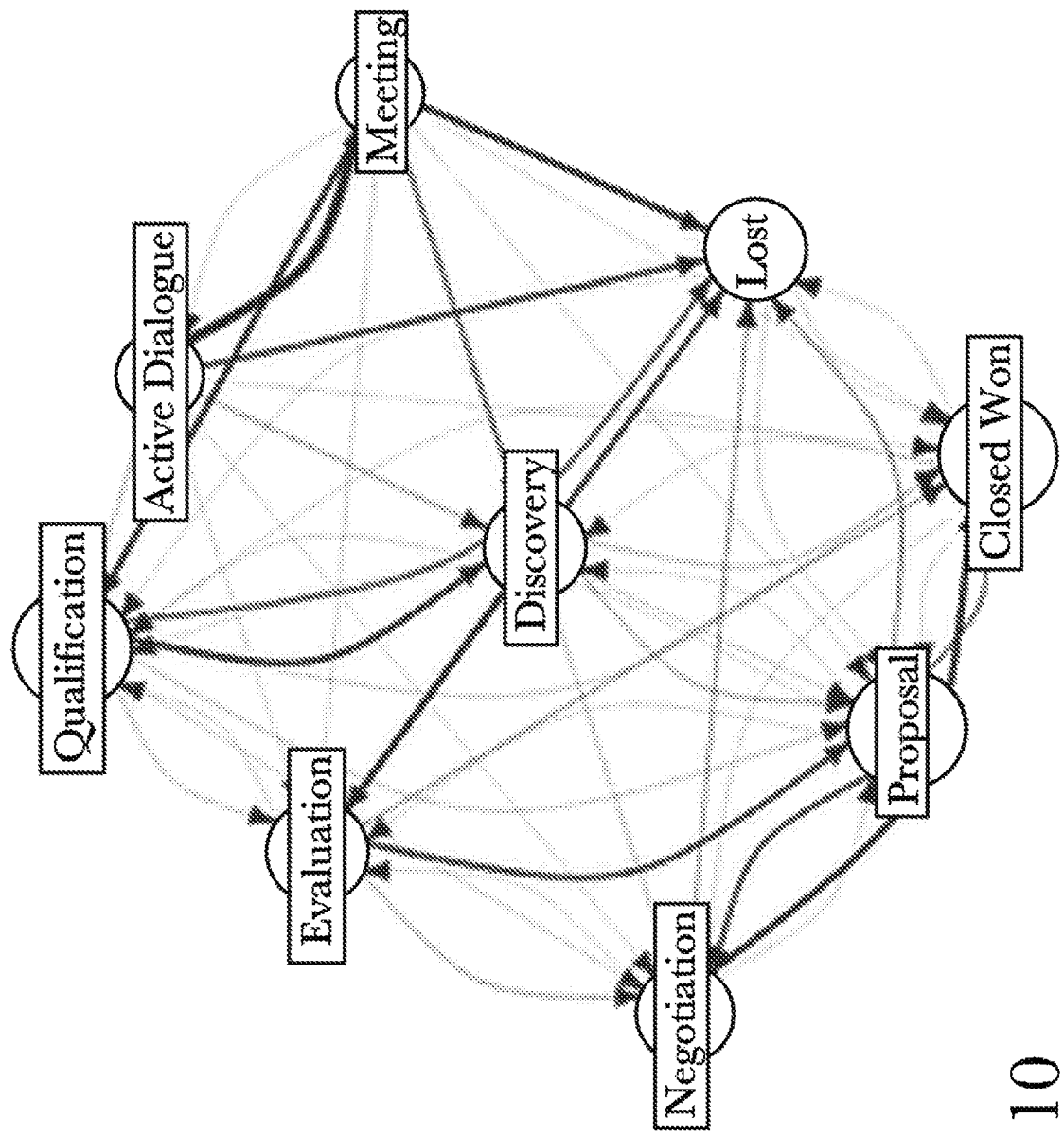
FIG. 10 is a flow diagram of exemplary opportunity state changes according to an embodiment of the invention.

FIG. 10 is a graph diagram of exemplary opportunity state changes according to an embodiment of the invention. Good "pre-pipeline" management really requires a deeper linkage between more traditionally separate sales and marketing responsibilities. In essence the platform represents the application of the next generation of sales operations techniques in the of domain sales development.

Figure 11:
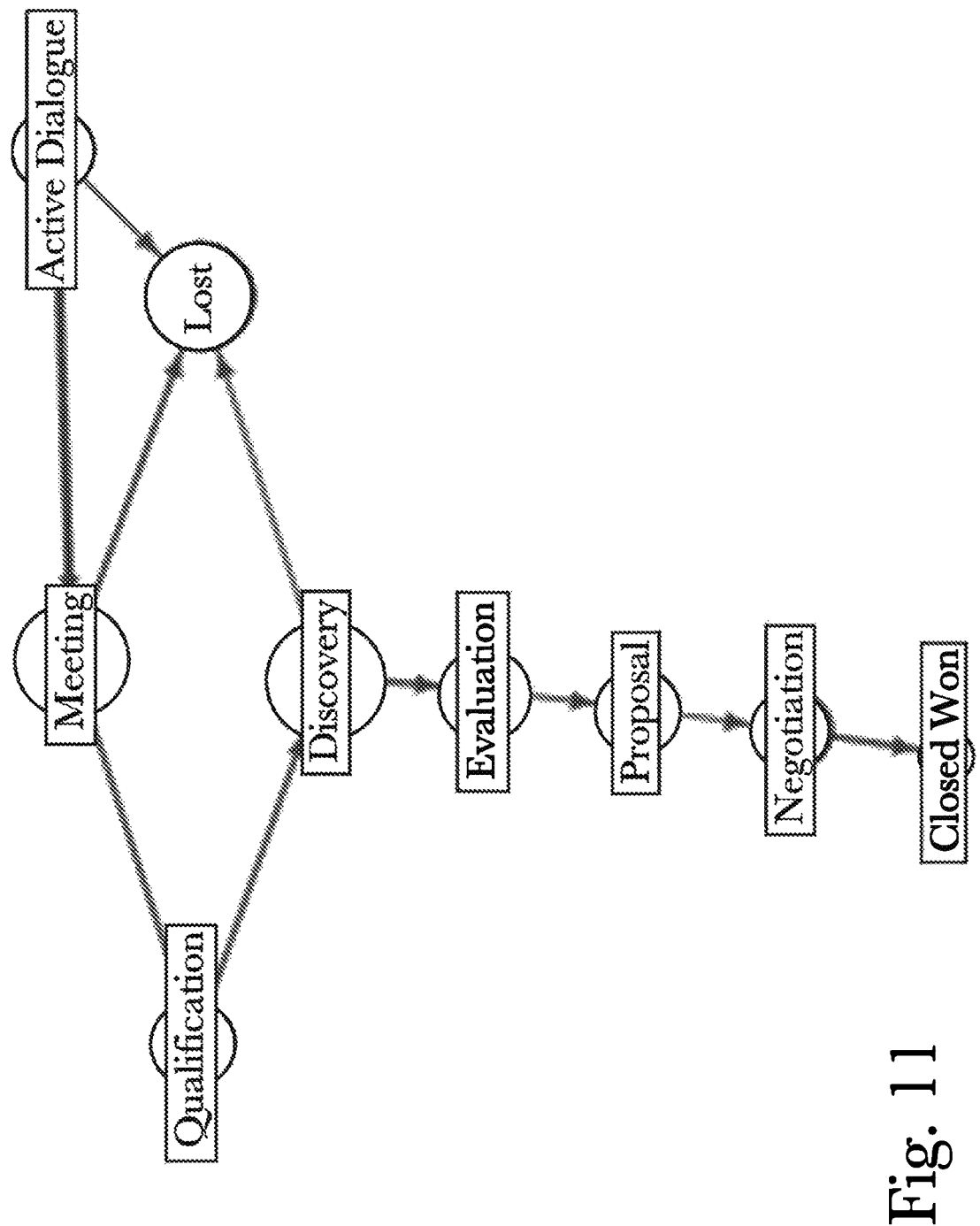
FIG. 11 is a flow diagram of opportunity state changes according to an embodiment of the invention.

FIG. 11 is a graph diagram of opportunity state changes according to an embodiment of the invention. In this use case the ISEP platform provides the insight, modeling and optimal management of the interaction sequences and interaction types to drive the creation of a B2B meeting or opportunity.

Figure 12:
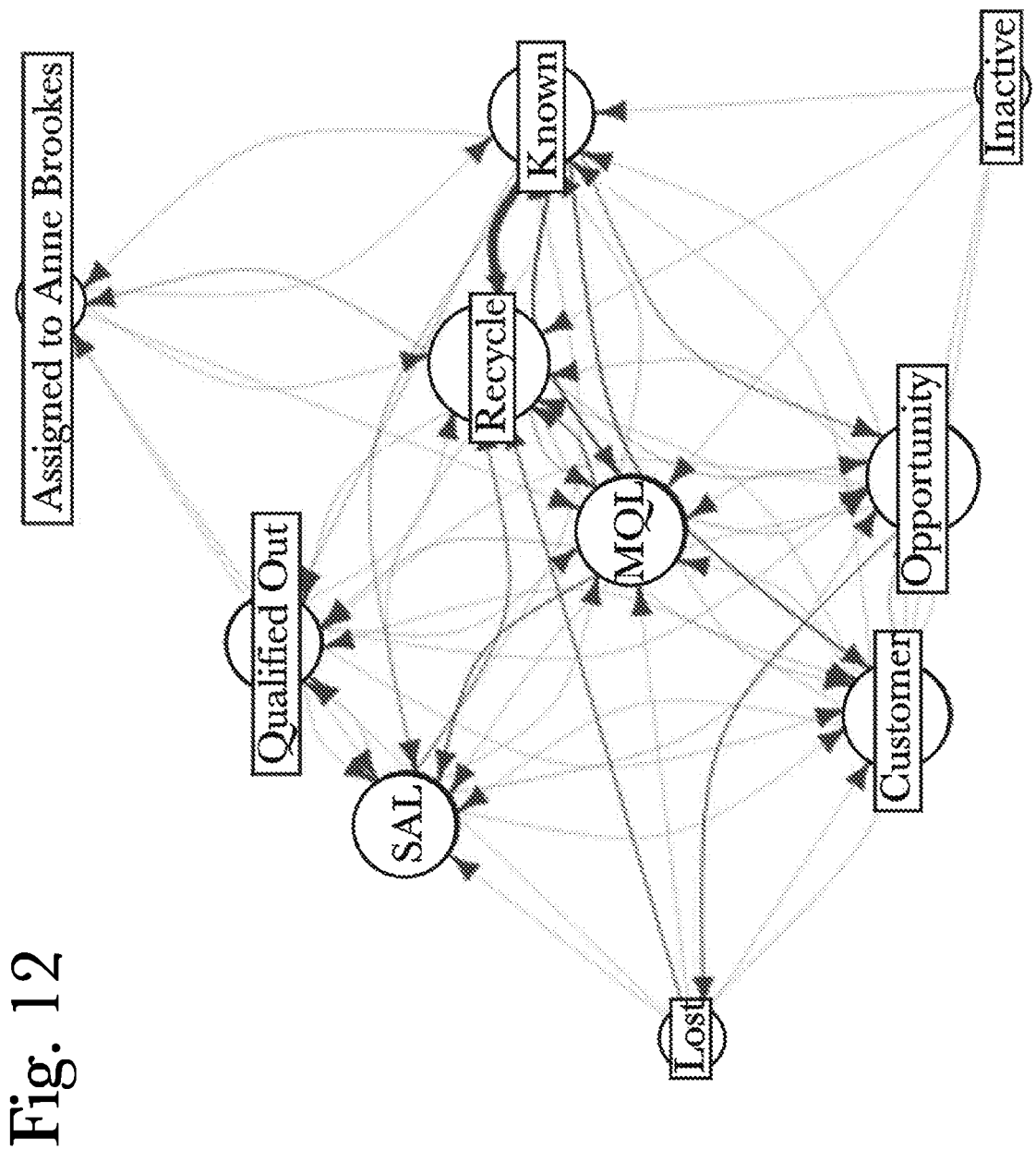
FIG. 12 is a flow diagram of exemplary contact state changes according to an embodiment of the invention.

FIG. 12 is a graph diagram of exemplary contact state changes according to an embodiment of the invention. The output decision variables are configurable but would typically include the sequence of activities (interactions) to perform and the individual sales reps to be assigned to the interactions.

Figure 13:
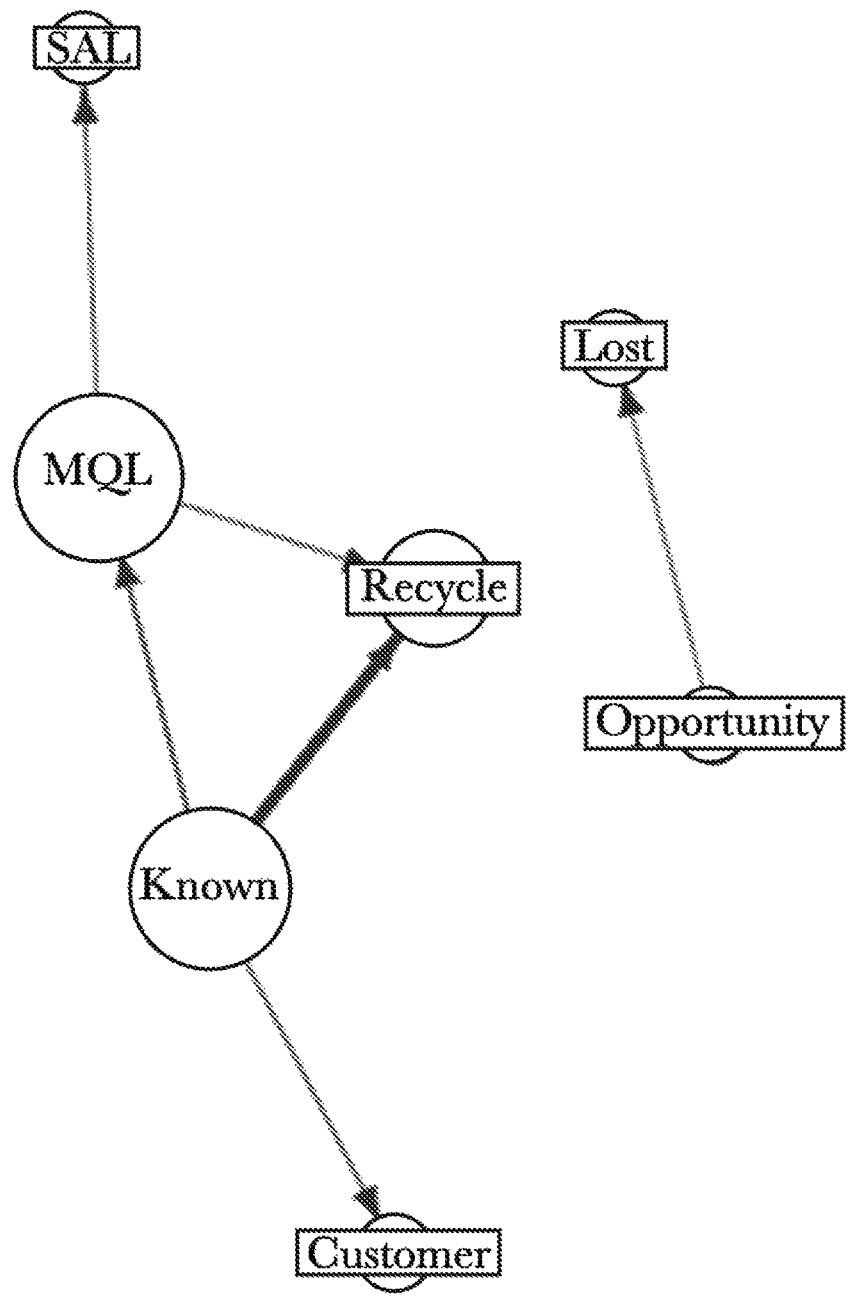
FIG. 13 is a flow diagram of a second aspect of contact state changes according to an embodiment of the invention.

FIG. 13 is a flow diagram of a second aspect of contact state changes according to an embodiment of the invention. Certain interactions lead to opportunity conversion % by lead source. Certain interactions lead to opportunity conversion % by segment. Certain interactions lead to opportunity conversion % by region. Certain interactions Lead to opportunity conversion % by tenure of sales rep Measure hit rate (as previously defined), by lead source by segment, by region. Target Rollover % (% of value of opps with a close date in a period that roll into the following period) by segment, by region and by sales person.

Details of the Supervised Machine Learning Models

The platform supports several supervised machine learning algorithms including:
Distributed Random Forest
Deep Learning
Generalized Linear
Gradient Boosted Machine
Naive Bayes In addition, Stacking Ensemble learning is supported whereby a second-level "meta learner" is applied to a group of base learners. For example, a meta learner using the Generalized Linear Model can be applied on top of an ensemble of Deep Learning, Random Forest, Gradient Boosted Machine, and Generalized Linear Model.

Stacking is a way to build the most accurate predictive model for the probability of a transition between any two nodes of the reduced graph.

Inclusion of "Hidden" (Unobservable) States

In some cases, a state of the graph may not be directly observable (definable) using the input event data, but knowledge of such a state may be very important from the business point of view. An example of such a hidden state is the intent of the prospect. A skilled sales person will infer the intention from human interactions but there is no direct measure of "intent" available in the data. However, the platform supports the definition and computations with such hidden states in the graph by use of a Hidden Markov Model. This allows the hidden state(s) to be included in the reduced graph.

State Survival Analysis

The supervised machine learning models described above capture the probability of the state transition. However, unless state dwell time is included as an input attribute, they don't provide insight on the temporal character of the transition and do not take into account that the data is right-censored in time. A common approach is simply to look at the distribution of dwell times in a specific state. However a deeper insight and proper treatment of data censoring can be gained by applying statistical time-to-event or "Survival" analysis. In this point of view, a prospect "lives" in a certain state for a period of time before experiencing a "death" of instantaneous classification into another state. This enables a deeper stratification study of which attributes influence the time to transition and these can be used to accelerate the transition or select prospects who will transition more quickly.

As well as being able to compute survival function, hazard function and density, log-rank tests can be used to test the null hypothesis that the survival functions of any two groups of prospects are different for this particular transition.

Optimization Model

The optimizer is configured by the administrator to define the decision variables, objective function and constraints. Examples are provided below Decision Variables
Which specific agents to assign to specific prospects
The specific time and channel on which to contact a prospect
A specific message to give to a prospect
A specific experience to push to a prospect
A specific transaction to propose to a prospect
A specific state transition to recommend to a prospect
Discussion of Constraints
Maximum concurrent capacity of each sales representative. Typical sales reps cannot handle more than 8 concurrent opportunities.
Balance utilization of sales reps.
An upper budget limit may be posed as a constraint
Discussion of Objective Functions
E.g. expected profit (sales revenues less costs incurred)
Optimization Algorithm The optimization problem here of sequential (multistage) stochastic optimization is extremely challenging. The platform uses a generic Approximate Dynamic Programming (ADP) framework with options for four different classes of optimization policy functions as listed below. Terminology in this area is quite fragment in both academia and industry but we point out that this approach is general and includes reinforcement learning and optimization by simulation as limiting cases.

Myopic Policies
Optimize cost now but don't use forecasts or representation of future decisions
Look-Ahead Policies
Explicitly optimize over a future horizon with approx. future info and actions
Policy Function Approximations
Directly return an action in a given state (no imbedded optimization or forecast of future info)
Value Function Approximations (Greedy Policies)
Approximation of the value of being in a future state as the result of a decision made now. Impact on future is solely in the value function
Benefits of ADP Algorithm
Scalable
Can be used for decision under uncertainty Can be used where the utility function is not available in a closed for expression but is the result of simulation.

The skilled person will be aware of a range of possible modifications of the various embodiments described above. Accordingly, the present invention is defined by the claims and their equivalents.

What is claimed is:

1. A system for machine-learning-assisted sales engagement, comprising:
    a network-connected computing device comprising a memory and a processor;
    a directed graph module comprising a first plurality of programming instructions stored in the memory and operating on the processor of the network-connected computing device, wherein the first plurality of programming instructions, when operating on the processor, causes the network-connected computing device to:
        monitor and capture sales related data, the sales related data comprising a plurality of interaction events between a business and its customers arising out of the sales process;
        construct a directed event graph of events from the data, wherein the vertices of the directed event graph represent the plurality of interaction events, and wherein the edges of the directed event graph represent transitions between the events;
        receive probabilities of transition between the plurality of interaction events from a machine learning module; and
        construct a directed state graph representing a reverse-engineered sales process from the directed event graph and the probabilities of transition, wherein the vertices of the directed state graph represent states of interaction between the business and its customers, and wherein the edges of the directed graph represent transitions between the states; and
    the machine learning module comprising a second plurality of programming instructions stored in the memory of, and operating on the processor of, the network-connected computing device wherein the second plurality of programming instructions, when operating on the processor, causes the network-connected computing device to:
        process the directed event graph through one or more machine learning models to determine probabilities of transition between each pair of interaction events in the directed event graph; and
        send the probabilities of transition to the directed graph module;
        receiving one or more performance metrics;
        processing the directed state graph through one or more machine learning models to determine an optimal path through the directed state graph for each performance metric;
        sending the determined optimal path for each performance metric to an optimization module; and
    the optimization module comprising a third plurality of programming instructions stored in the memory of, and operating on the processor of, the network-connected computing device wherein the third plurality of programming instructions, when operating on the processor, cause the network-connected computing device to:
        choose one or more performance metrics for evaluation;
        send each performance metric to the machine learning module;
        receive the determined optimal path through the directed state graph for each performance metric from the machine-learning model;
        create a new sales process from the determined optimal paths from each of the performance metrics.

2. A method for machine-learning-assisted sales engagement, comprising:
    using a directed graph module operating on a network-connected computing device comprising a memory and a processor to:
        monitor and capture sales related data, the sales related data comprising a plurality of interaction events between a business and its customers arising out of the sales process;
        construct a directed event graph of events from the data, wherein the vertices of the directed event graph represent the plurality of interaction events, and wherein the edges of the directed event graph represent transitions between the events;
        receive probabilities of transition between the plurality of interaction events from a machine learning module operating on the computing device; and
        construct a directed state graph representing a reverse-engineered sales process from the directed event graph and the probabilities of transition, wherein the vertices of the directed state graph represent states of interaction between the business and its customers, and wherein the edges of the directed graph represent transitions between the states; and
    using the machine learning module to:
        process the directed event graph through one or more machine learning models to determine probabilities of transition between each pair of interaction events in the directed event graph; and
        send the probabilities of transition to the directed graph module;
        receiving one or more performance metrics;
        processing the directed state graph through one or more machine learning models to determine an optimal path through the directed state graph for each performance metric;
        sending the determined optimal path for each performance metric to an optimization module operating on the computing device; and
    using the optimization module to:
        choose one or more performance metrics for evaluation;
        send each performance metric to the machine learning module;
        receive the determined optimal path through the directed state graph for each performance metric from the machine-learning model; and
        create a new sales process from the determined optimal paths from each of the performance metrics.

* * * * *